United States Patent [19]
Morikawa

[11] Patent Number: 4,995,354
[45] Date of Patent: Feb. 26, 1991

[54] TWO-CYCLE ENGINE

[75] Inventor: Koji Morikawa, Tokyo, Japan

[73] Assignee: Fuji Jukogyo Kabushiki Kaisha, Tokyo, Japan

[21] Appl. No.: 449,816

[22] Filed: Dec. 13, 1989

[30] Foreign Application Priority Data

Dec. 21, 1988 [JP] Japan .................. 63-324665

[51] Int. Cl.⁵ .......................................... F02B 75/02
[52] U.S. Cl. .............................. 123/65 V; 123/190 A
[58] Field of Search ............. 123/65 PE, 65 V, 65 A, 123/73 V, 80 BA, 73 R, 323, 190 A

[56] References Cited

U.S. PATENT DOCUMENTS

| 918,211 | 4/1909 | Snyder | 123/73 C |
|---|---|---|---|
| 2,110,754 | 3/1938 | Alston | 123/65 V |
| 2,474,879 | 7/1949 | Winfield | 123/65 V |
| 4,244,338 | 1/1981 | Rassey | 125/51 AA |
| 4,354,459 | 10/1982 | Maxey | 123/80 BA |
| 4,545,337 | 10/1985 | Lyons et al. | 123/80 BA |

FOREIGN PATENT DOCUMENTS

| 2808138 | 8/1979 | Fed. Rep. of Germany | 123/65 BA |
|---|---|---|---|
| 3712750 | 11/1988 | Fed. Rep. of Germany | 123/65 PE |
| 823459 | 1/1938 | France | 123/65 V |
| 62-97229 | 6/1987 | Japan | |

Primary Examiner—David A. Okonsky
Attorney, Agent, or Firm—Beveridge, DeGrandi & Weilacher

[57] ABSTRACT

A two-cycle engine having a fuel injector, scavenge port and an exhaust port is provided with a scavenge pump for supplying scavenging air into a cylinder. An exhaust rotary valve is connected to the exhaust port to open and close the port. Similarly, a scavenge rotary valve is connected to the scavenge port to open and close the port. Engine operating condition including engine speed and degree of depressing the accelerator pedal, representing the engine load, is inputted to a control unit, which variably controls the timings of opening and closing the exhaust and scavenge rotary valves in accordance with the engine operating condition.

6 Claims, 4 Drawing Sheets

TWO-CYCLE ENGINE

BACKGROUND OF THE INVENTION

The present invention relates to a two-cycle engine with a scavenge pump for feeding air into the engine and with a direct fuel injection system, and more particularly to a system for controlling the timing of opening and closing scavenge and exhaust rotary valves in the engine.

In two-cycle engines, each cycle is completed with one revolution of a crankshaft so that self-intake operation into a cylinder is not carried out. For this reason, a method is used wherein air is induced into a crankcase with the use of vacuum generated in a crankcase while a piston is in its upward strokes, and wherein intake into the cylinder is carried out through a scavenge port by increased pressure in the crankcase due to downward strokes of the piston while the gases produced after combustion in the cylinder is forced out of the cylinder by the scavenging flow of the intake gas. Further, for control depending upon the load on the engine, a throttle valve is provided in an intake system, and the amount of intake is adjusted by varying the degree of opening of the throttle valve.

In such a known system, the scavenging flow tends to be insufficient under low load condition due to a small amount of intake, and this causes misfiring with resultant unstable operation of the engine. Moreover, it is difficult to obtain a smooth torque characteristic of the engine in accordance with operating conditions so that much fuel is consumed and exhaust gas is degraded. Furthermore, there is a limit to increase in the scavenging ability of the engine with such a type of scavenging system using the crankcase pressure. This means that it is difficult to obtain a sufficiently increased torque of the engine under high load.

Under such circumstances, it has been desired to obtain increased scavenging ability and to reduce flow of the fuel through the cylinder. With a view to realizing the above, it has been proposed to use a scavenge pump for increasing the scavenging pressure and to inject the fuel directly into the cylinder chamber by means of a fuel injector so as to prevent the unburnt fuel from flowing through the cylinder during the scavenging.

A two-cycle engine provided with a scavenge pump and a fuel injector is disclosed in, for example, Japanese Utility Model Laid-Open (unexamined) Publication No. 62-97,229. The two-cycle engine disclosed in this publication is provided with overhead valves as in the case of a four-cycle engine and with a supercharger in an intake system and an exhaust blower in the exhaust system. The supercharger and/or the exhaust blower are operated depending upon the operating condition of the engine.

In the known two-cycle engine described above, low scavenging efficiency accompanied by the overhead valves must be compensated for by the supercharger and the exhaust blower, so that the engine necessarily has a complicated construction as well as increased loss of power for driving auxiliary mechanisms of the engine. Furthermore, in the known engine, timing of opening and closing the intake and exhaust valves is always fixed, so that it is not possible to increase the scavenging efficiency and the output of the engine in accordance with the engine operating conditions.

SUMMARY OF THE INVENTION

It is the object of the present invention to provide a two-cycle engine with a cylinder having scavenge and exhaust ports, wherein timing of opening and closing the ports is variably controlled in dependency on engine operating condition to obtain large torque and low fuel consumption over a wide range of operation of the engine.

According to the present invention, there is provided a two-cycle engine having a cylinder, a piston slidable in the cylinder, an exhaust port for being opened and closed by the piston, a scavenge port for being opened and closed by the piston, a scavenge pump connected to said scavenge port for supplying scavenging air into the cylinder, and a fuel injector for injecting fuel into the cylinder: said engine comprising: an exhaust rotary valve connected to said exhaust port for opening and closing the exhaust port; a scavenge rotary valve connected to said scavenge port for opening and closing the scavenge port; detector means for detecting operating condition of the engine; and control means responsive to operating condition of the engine for variably controlling timings of opening and closing the exhaust and scavenge rotary valves.

The control means may have timing determining means which operates to delay the timing of opening the exhaust rotary valve to a timing after the exhaust port opens, responsive to low speed and low load, and which operates to set the timing of opening the exhaust rotary valve substantially equal to a timing of opening the exhaust port, responsive to high speed and high load.

When the timing of opening the exhaust rotary valve is delayed to a timing after the opening of the exhaust port at low speed and under low load, the exhausting operation starts with delay whereby effective downward stroke of the piston becomes longer and the work volume done by the piston increases with resultant increase of the engine power.

On the other hand, when the timing of opening the exhaust rotary valve is substantially equal to a timing of the opening of the exhaust port at high speed and under high load, blow-down of exhaust gas by the piston in its downward stroke promotes exhausting operation so that the output power of the engine is increased.

The timing of opening the scavenge rotary valve is set to be later than the timing of opening the scavenge port and to be later than the timing of opening the exhaust port and the exhaust rotary valve. Furthermore, the timing of closing the scavenge port is set to be before the timing of closing the scavenge rotary valve and the exhaust port and after the timing of closing the exhaust rotary valve.

The feature stated above is advantageous in that even after the exhausting operation has completed, air is still supplied into the cylinder whereby the efficiency of filling the cylinder is improved.

A preferred embodiment of the present invention will become understood from the following detailed description referring to the accompanying drawings.

BRIEF DESCRIPTION OF THE DRAWINGS

FIG. 1A is a timing chart similar to FIG. 2 in the state of low speed and low load.

DETAILED DESCRIPTION OF THE PREFERRED EMBODIMENT

Figure 1:
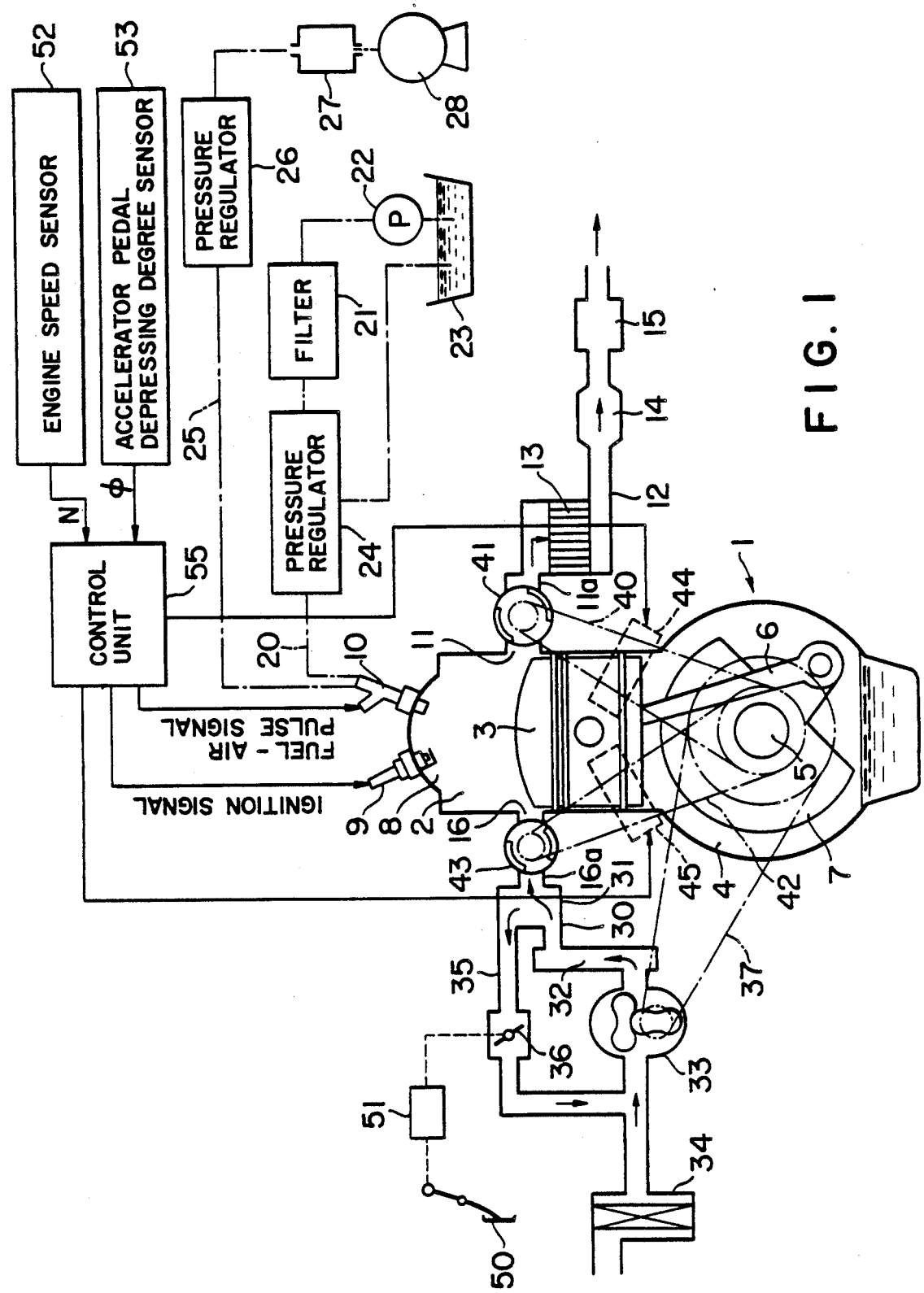
FIG. 1 is a schematic diagram of a two-cycle engine of the present invention.

Referring to FIG. 1, a two-cycle engine 1 shown comprises a cylinder 2, a piston 3 slidable in the cylinder 2, a connecting rod 6 connected with the piston 3 and a crankshaft 5 disposed in a crankcase 4. A counterweight 7 is mounted on the crankshaft 5.

In the wall of the cylinder 2, an exhaust port 11 and a scavenge port 16 are formed in 90 degrees angular disposition or in opposing disposition. The ports 11 and 16 are opened and closed by the piston 3 with a predetermined timing.

A spark plug 9 and a two-fluid injector 10 are provided on the top of a combustion chamber 8 of the cylinder 2. The injector 10 is of a type where a predetermined amount of fuel is injected together with compressed air in the form of air-fuel mixture. Fuel is supplied from a fuel tank 23 to the injector 10 through a fuel passage 20 having a filter 21, a fuel pump 22 and a fuel pressure regulator 24 for constantly maintaining the fuel at a predetermined low pressure. The fuel is mixed with air which is supplied to the injector 10 from an air compressor 28 passing through an air passage 25 having an accumulator 27 and an air pressure regulator 26.

The engine 1 is supplied with air through an air cleaner 34, a displacement scavenge pump 33, an intercooler 32 for cooling scavenge air, an intake pipe 30 having a scavenge chamber 31 for absorbing scavenge pressure waves when the scavenge port 16 opens and closes. A bypass 35 is provided around the scavenge pump 33 and the intercooler 32. The bypass 35 is provided with a control valve 36. Exhaust gas of the engine 1 is discharged through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt passed over a crank pulley and a pump pulley. The scavenge pump 33 is driven by the crankshaft 5 through the transmitting device 37 for producing a scavenge pressure. An accelerator pedal 50 is operatively connected with the control valve 36 through a valve controller 51. The degree of opening of the control valve 36 is controlled by the controller 51 to be inversely proportional to the degree of depression of the accelerator pedal 50. Further, an engine speed sensor 52 and an accelerator pedal depressing degree sensor 53 are provided for determining engine operating conditions.

Output signals from the sensors 52 and 53 are supplied to a control unit 55 which feeds an ignition signal and a fuel supply pulse signal and an air supply pulse signal to the spark plug 9 and the injector 10, respectively. When the fuel pulse signal is supplied, a predetermined quantity of fuel is fed into the injector 10, and when the air injection pulse signal is supplied after the exhaust port 11 has closed, pressurized air is fed to the injector 10 to cause injection of fuel-air mixture.

The exhaust port 11 and the scavenge port 16 are positioned to have a large angular range of opening of the ports so as to be adapted for high-speed operation of the engine. More particularly, the angular range of opening of the exhaust port 11 is, for example, 90 degrees before and after the bottom dead center BDC, and the angular range of opening of the scavenge port 16 is, for example, 80 degrees before and after the bottom dead center BDC, as shown in FIG. 2.

As illustrated in FIG. 1, there is provided an exhaust rotary valve 41 in an exhaust passage 11a communicating with the exhaust port 11. The exhaust rotary valve 41 is constantly rotated by way of a transmission device 40 by the crankshaft 5. There is further provided a scavenge rotary valve 43 in a scavenge passage 16a communicating with the scavenge port 16. The scavenge rotary valve 43 is also constantly rotated by way of a transmission device 42 by the crankshaft 5.

Figure 2:
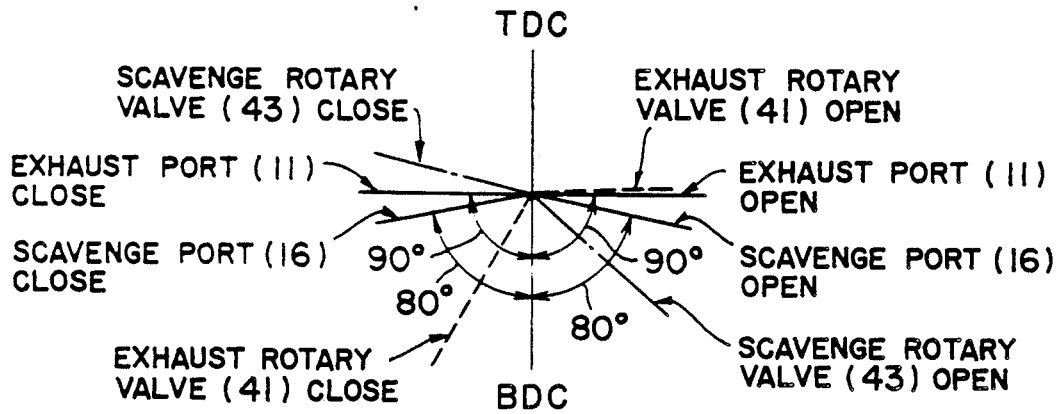
FIG. 2 is a timing chart showing opening and closing of exhaust and scavenge ports and of exhaust and scavenge rotary valves.

The exhaust rotary valve 41 has a phase change device 44, which operates to change the timings of opening and closing the rotary valve 41, shown in broken lines in FIG. 2. The scavenge rotary valve 43 has also a phase change device 45, which operates to change the timings of opening and closing the rotary valve 43, shown in dot-and-dash lines in FIG. 2. Thus, the exhaust rotary valve 41 and the scavenge rotary valve 43 serve to determine the exhausting period and the scavenging period, respectively.

Figure 1A:
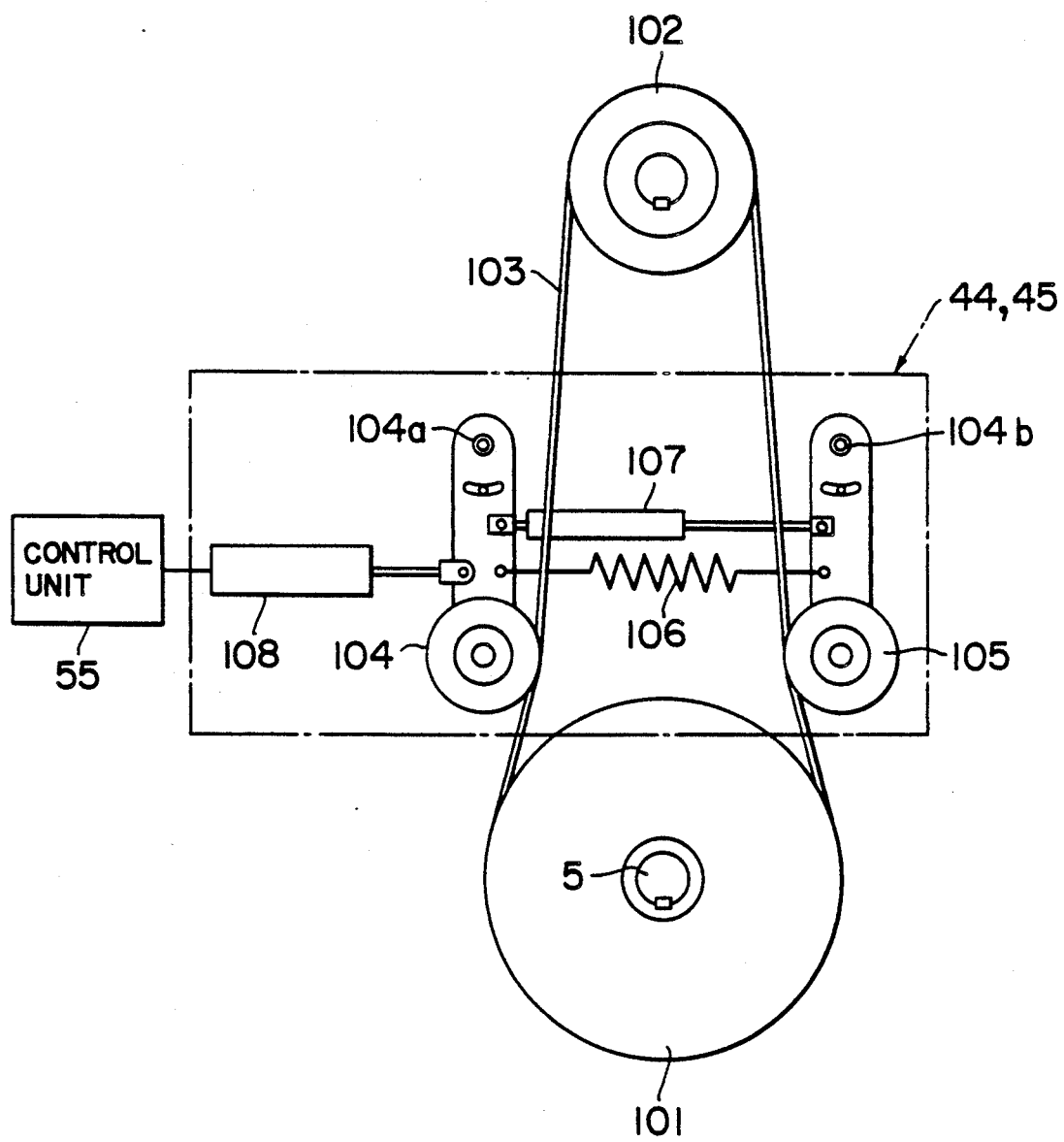
FIG. 1A is a view showing the principle of a phase change device.

Each phase change device 44 or 45 may be mounted on the transmission device 40 or 42 having a pulley 101 mounted on the crankshaft 5, a pulley 102 to rotate the rotary valve 41 or 43 and a belt 103 passed around the both pulleys 101, 102. As shown in FIG. 1A, each phase change device 44 or 45 further comprises a couple of tensionors 104 and 105, a spring 106, an oil damper 107 and an actuator 108, respectively. Each tensionor is rotatably mounted on the periphery of the belt 103 to urge the belt inwardly. The spring 106 is provided to connect the both tensionors 104 and 105 for reducing the play of the belt 103. The oil damper 107 disposed between both the tensionors 104 and 105 to prevent the tensionors from rapid movement. The actuator 108 operates the tensionor 104 to control the urging force by changing the displacement of the tensionor 104, so that the phase of the rotary valve against that of the crankshaft is changed. Japanese Utility Model Application Laid-Open No. 61-179307 discloses the abovementioned type of the phase change device.

The exhaust rotary valve 41 has a fixed angular range of opening in which the valve maintains an opening state, so that if the timing of opening the valve is advanced or delayed, the timing of closing the valve is accordingly advanced or delayed, respectively. The scavenge rotary valve 43 has the same construction as the exhaust rotary valve 41.

The engine is controlled by a control system described below. The accelerator pedal 50 is connected to the control valve 36 through the controller 51 which is means for changing the degree of opening of the valve 36 in inverse proportion to the degree of depression of the accelerator pedal 50, as described hereinbefore. The engine speed sensor 52 detects the engine speed N while the accelerator pedal depressing degree sensor 53 detects the degree $\phi$ of depressing the accelerator pedal 50. The control unit 55 feeds signals to the spark plug 10 and the injector 10, as mentioned before, as well as to the phase change devices 44 and 45 of the exhaust and scavenge rotary valves 41 and 43, respectively.

Figure 3:
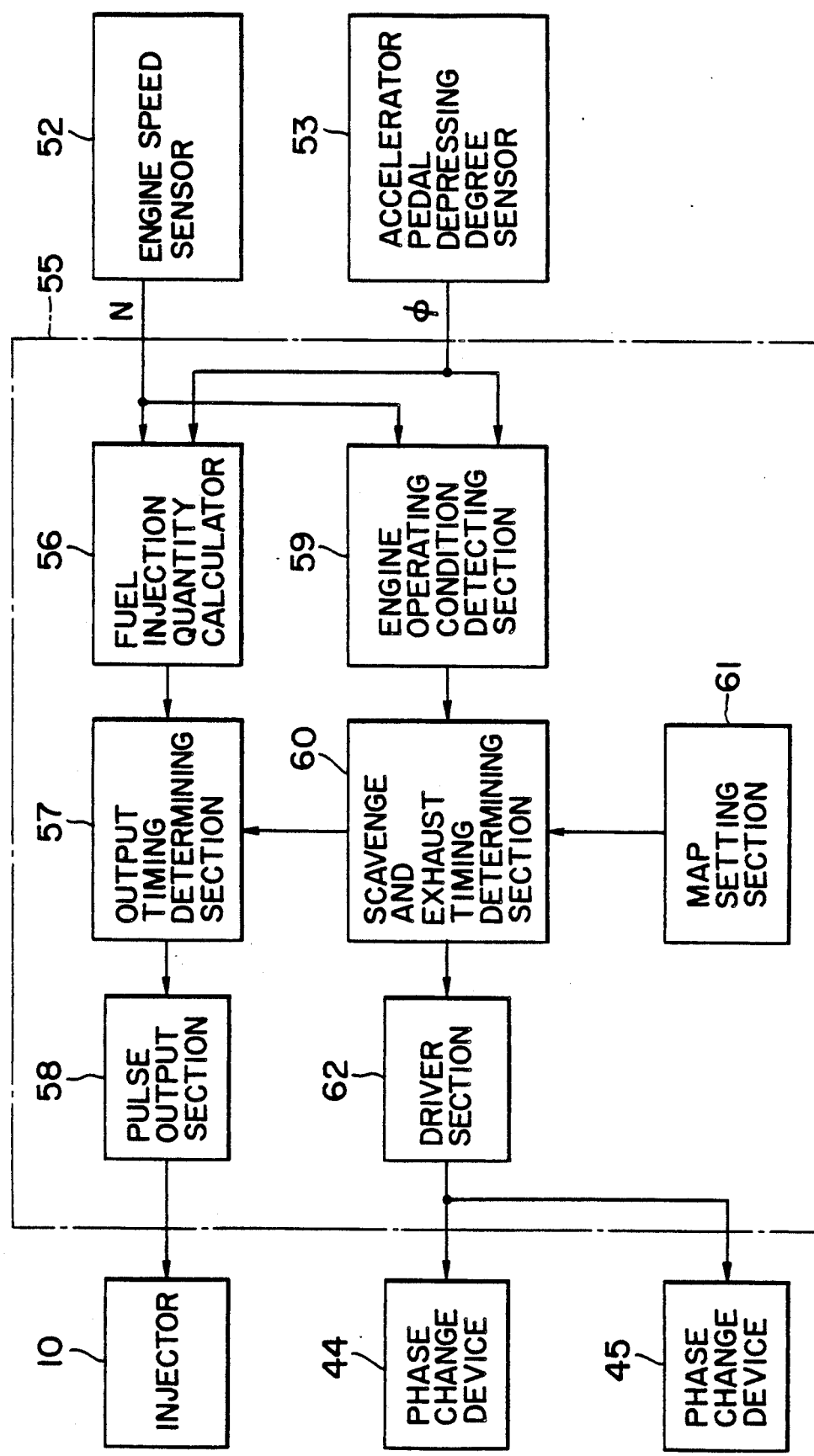
FIG. 3 is a block diagram showing a control unit used in the present invention.

The control unit 55 will be described below in more detail with reference to FIG. 3. The control unit 55 has a fuel injection quantity calculator 56 to which a signal of the engine speed N and a signal of the degree $\phi$ of depressing the accelerator pedal 50 (referred to as "accelerator pedal depressing degree $\phi$" hereinafter) are delivered. Responsive to the signals N and $\phi$, the calculator 56 calculates the quantity of fuel to be injected into the cylinder 2, suitable under the operating condition represented by the engine speed N and accelerator pedal depressing degree $\phi$.

Output signal from the calculator 56 is supplied to an output timing determining section 57 to which are delivered a scavenge timing signal and an exhaust timing signal from a scavenge and exhaust timing determining section 60 to be described later. The output timing determining section 57 determines an output timing of ejection of air-fuel mixture, responsive to the signals from the fuel injection quantity calculator 56 and from the scavenge and exhaust timing determining section 60. The output timing is set to a timing after both the scavenge port 16 and the exhaust port 11 are closed. Output timing signal from the section 57 is supplied to a pulse output section 58 from which a pulse signal is delivered to the injector 10 for injecting air-fuel mixture into the cylinder 2.

The control unit 55 further has an engine operating condition determining section 59 to which the signals of the engine speed N and the accelerator pedal depressing degree $\phi$ are fed from the sensor 53. An engine operating condition signal is delivered from the section 59 to the scavenge and exhaust timing determining section 60. The section 60 determines phase angles of the exhaust rotary valve 41 and the scavenge rotary valve 43 in comparison with a map in a map setting section 61. Signals of the phase angles of the rotary valves 41 and 43 are supplied to a driver section 62 for operating the phase change devices 44 and 45 of the rotary valves 41 and 43.

How the control unit 55 operates will be described below with reference to FIGS. 4A and 4B.

Figure 4A:
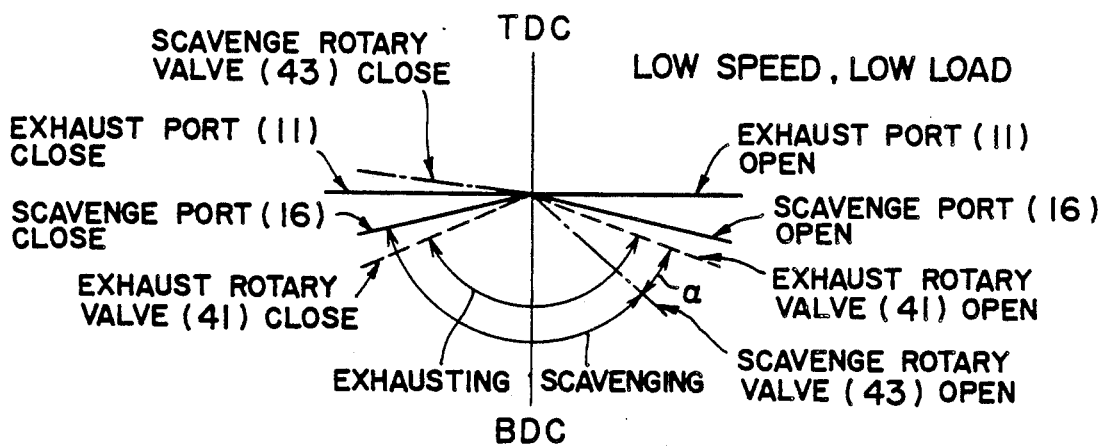
FIG. 4B is a timing chart similar to FIG. 2 in the state of high speed and high load.

At low speed and under low load, the scavenge and exhaust timing determining section 60 operates, as shown in FIG. 4A, to delay the timing of opening the exhaust rotary valve 41 to a timing later than the timing of opening the exhaust port 11 and to delay the timing of closing the exhaust rotary valve 41 to a timing still prior to the closing of the scavenge port 16. Furthermore, the timing determining section 60 operates to provide a predetermined angular range $\alpha$ by which the opening of the exhaust rotary valve 41 is in advance of the time of opening the scavenge rotary valve 43.

Figure 4B:
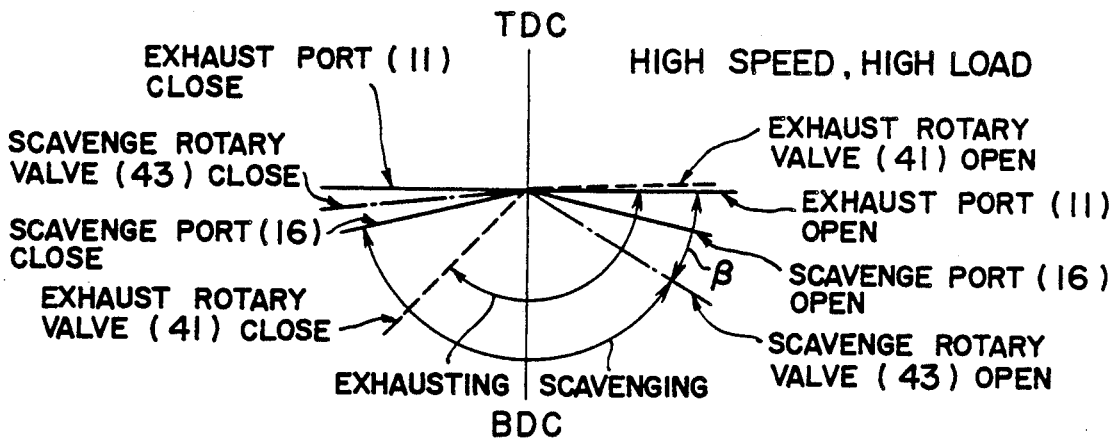

At high speed and under high load, the scavenge and exhaust timing determining section 60 operates, as shown in FIG. 4B, to advance the opening of the exhaust rotary valve 41 to a timing which is equal to or slightly prior to the opening of the exhaust port 11 and to maintain the closing of the exhaust rotary valve 41 prior to the closing of the scavenge port 16. The timing determining section 60 further operates to open the scavenge rotary valve 43 after the opening of the exhaust port 11 with a predetermined angular range $\beta$ by which the opening of the exhaust port 11 is in advance of the opening of the scavenge rotary valve 43. Moreover, the timing determining section 60 operates to set the timing of closing the scavenge rotary valve 43 to a timing later than the timing of closing the scavenge port 16.

The two-cycle engine described above operates as follows.

Air to be sucked is first passed through the air cleaner 34 and fed by the scavenge pump 33 into the intercooler 32 where the air is cooled. The cooled air partly advances into the cylinder 2 through the scavenge rotary valve 43 and the scavenge port 16, while the remaining part of the cooled air circulates through the bypass 35. The quantity of the air circulating through the bypass 35 is adjusted by the control valve 36. It will be noted that a quantity of the air other than the quantity of the air flowing into the bypass 35 is introduced into cylinder 2.

As mentioned before, the degree of opening $\theta$ of the control valve 36 is in inverse proportion to the accelerator pedal depressing degree $\phi$. Therefore, the smaller the accelerator pedal depressing degree $\phi$, the larger is the degree of opening $\theta$ of the control valve 36, whereby more cooled air circulates through the bypass 35 and lesser quantity of scavenge air is introduced into the cylinder 2. Therefore, loss of power due to the operation of the scavenge pump 33 is maintained at a minimum.

When the piston 3 approaches the bottom dead center, as shown in FIG. 1, with both the exhaust port 11 and the scavenge port 16 opened, a quantity of the scavenge air is pressurized by the scavenge pump 33 in accordance with the accelerator pedal depressing degree and is introduced into the cylinder 2 via the scavenge port 16 after being cooled by the intercooler 32. The thus introduced scavenge air forces the gas remaining in the cylinder out of the cylinder 2 through the exhaust port 11, thus carrying out the scavenging operation to enable introduction of only the air into the cylinder 2 in a short time. When the piston 3 undergoes its upward stroke, it closes the scavenge port 16 and the exhaust port 11, whereby the scavenging operation is completed and a compression stroke takes place.

After the exhaust port 11 closes, fuel preliminarily supplied into the injector 10 responsive to the fuel supply pulse is injected from the injector 10 with pressurized air responsive to an air supply pulse, whereby the fuel-air mixture is produced within the cylinder 2. The ignition plug 9 is ignited immediately prior to the top dead center TDC and combustion takes place in the cylinder 2. In this case, the fuel is injected from the injector 10 at the top of the combustion chamber 8 at a suitable timing and for a suitable period. The fuel thus injected is intermixed with the scavenging air flow from the scavenge port 16 and arrives below the ignition plug 9. In the vicinity of the plug 9, dense fuel-air mixture is collected and therefore stratified combustion is carried out.

After explosion as a result of the combustion, the piston 3 moves down for expansion of the combusted gas, and the exhaust port 11 opens first to allow exhaust of the combusted gas due to the internal pressure in the cylinder 2. When the piston 2 approaches the bottom dead center, the scavenging operation accompanied by supply of fresh air is effected as described hereinbefore. Thus, the engine continues to operate.

During the operation of the engine in the manner stated above, a quantity of scavenging air corresponding to the load is introduced into the cylinder 2 by adjusting the control valve 36 due to the depression of the accelerator pedal 50. The quantity of injection of fuel is calculated at the fuel injection quantity calculator 56, responsive to the engine speed N and the accelerator pedal depressing degree $\phi$. A thus calculated quantity signal of fuel is outputted from the calculator 56, and the quantity and timing of injection of the fuel from the injector 10 are controlled. Therefore, the ratio of fuel to air in the fuel-air mixture is maintained substantially constant, and the engine is controlled in dependency on the load by changing the quantity of the fuel-air mixture to be introduced into the cylinder 2.

On the other hand, the operating condition including the engine speed N and the accelerator pedal depressing degree $\phi$ is detected by the sensors 52 and 53 and inputted to the engine operating condition detecting section 59. Based on the thus detected operating condition, the scavenge and exhaust timings are determined at the timing determining section 60, and the phase change devices 44 and 45 are adjusted through the driver section 62 to change the phase settings thereof. As a result, the timings of opening and closing the exhaust rotary valve 41 and the scavenge rotary valve 43 are changed. The two rotary valves 41 and 43 repeat to open and close alternately while they are constantly rotated by the crankshaft 5. Thus, actual angular ranges of scavenging and exhausting operations are set in connection with the opening and closing of the scavenge and exhaust ports 16 and 11, in accordance with the operating condition of the engine.

More specifically, at low speed and under low load, the timings as shown in FIG. 4A are set. That is, even when the exhaust port 11 and the scavenge port 16 are opened during the downward stroke of the piston 3, the exhaust and scavenge operations do not take place immediately. After the scavenge port 16 has opened, the exhaust rotary valve 41 opens and then the scavenge rotary valve 43 opens. Therefore, the timing of start of the exhausting operation is delayed relative to the timing of opening the exhaust port 11 in the state of low speed and low load wherein the quantity of exhaust gas is small. For this reason, the effective downward stroke of the piston 3 is prolonged whereby the work volume of the engine 1 is increased with resultant increase of power at low speed and under low load.

When the exhaust rotary valve 41 opens, gas remaining in the cylinder 2 is exhausted due to its internal pressure through the exhaust port 11 during the angular range $\alpha$. Thereafter, when the scavenge rotary valve 43 opens, the air is introduced into the cylinder 2, and scavenging and exhausting operations are carried out. Then, the exhaust rotary valve 41 closes before the exhaust port 11 is closed. Because the scavenge port 16 is closed after completion of the exhausting operation as a result of closing the exhaust rotary valve 41, air is fed into the cylinder 2 until the scavenge port 16 is closed, whereby loss caused by the blowing air through the cylinder is made up and the efficiency of filling the cylinder 2 is improved.

At high speed and under high load, the timings as shown in FIG. 4B are set. That is, the exhaust port 11 and the exhaust rotary valve 41 is opened at the same time, and the exhausting operation takes place. Thereafter, the scavenge port 16 opens but the scavenge rotary valve 43 has not yet opened so that the scavenging operation does not take place. On the other hand, even when the exhaust port 11 opens and then the scavenge port 16 opens, the scavenging operation does not take place with remaining gas being exhausted until the scavenge rotary valve 43 opens later after lapse of time corresponding to the angular range $\beta$.

When the scavenge rotary valve 43 opens, the scavenging operation takes place to feed fresh air into the cylinder 2. The scavenge port 16 closes after the exhaust rotary valve 41 is closed and before the scavenge rotary valve 43 is closed. Air is supplied into the cylinder 2 in the period between the closing of the exhaust rotary valve 41 and the closing of the scavenge port 16 whereby the loss caused by the blowing of the scavenging air through the cylinder is made up. The supply of air into the cylinder 2 after completion of the exhaust of gas serves to improve the efficiency of filling the cylinder.

It is to be noted that at high speed and under high load, the timing of start of the exhaust is advanced relative to the timing of start of the exhaust in the case of low speed and low load, whereby blow-down of the exhaust gas by the descending piston 3 in its downward stroke causes sufficient exhausting operation, which results in increase of the output power of the engine.

It will be understood from the foregoing that according to the present invention a high-torque characteristic is obtained throughout the entire range of operation of the engine.

While the presently preferred embodiment of the present invention has been shown and described, it is to be understood that the disclosure is for the purpose of illustration and that various changes and modifications may be made without departing from the scope of the invention as set forth in the appended claims.

What is claimed is:

1. A two-cycle engine having a cylinder, a piston slidable in the cylinder, an exhaust port for being opened and closed by the piston, a scavenge port for being opened and closed by the piston, a scavenge pump connected to said scavenge port for supplying scavenging air into the cylinder, and a fuel injector for injecting fuel into the cylinder, comprising:
   an exhaust rotary valve connected to said exhaust port for opening and closing the exhaust port;
   a scavenge rotary valve connected to said scavenge port for opening and closing the scavenge port;
   detector means for detecting an operating condition of the engine; and
   control means responsive to the operating condition of the engine for variably controlling timings of opening and closing the exhaust and scavenge rotary valves.

2. The two-cycle engine according to claim 1, wherein said control means has timing determining means responsive to detection of low speed and low load for delaying the timing of opening the exhaust rotary valve to a timing after the exhaust port opens, and responsive to detection of high speed and large load for setting the timing of opening the exhaust rotary valve substantially equal to a timing of opening the exhaust port.

3. The two-cycle engine according to claim 2, wherein the timing of opening the scavenge rotary valve is set to be later than the timing of opening the scavenge port and to be later than the time point of opening the exhaust port and the exhaust rotary valve and wherein the timing of closing the scavenge port is set to be before the timing of closing the scavenge rotary valve and the exhaust port and after the timing of closing the exhaust rotary valve.

4. The two-cycle engine according to claim 1, wherein said control means comprises:

scavenge and exhaust timing determining means responsive to said engine operating condition for delivering a scavenge and exhaust timing signal after comparing the engine operating condition signal with a map set in map setting means; and phase change means provided for said exhaust and scavenge rotary valves, respectively, to change the timings of opening and closing of the valves, said phase change means being responsive to said scavenge and exhaust timing signal to control the timings of opening and closing said valves in accordance with the engine operating condition.

5. The two-cycle engine according to claim 4, wherein said control means further comprises:

a fuel injection quantity calculator responsive to the engine speed and the degree of depressing an accelerator pedal to output a fuel injection quantity signal;

output timing determining means responsive to said fuel injection quantity signal and said scavenge and exhaust timing signal to deliver an output timing signal; and pulse output means responsive to said output timing signal to deliver a pulse signal to said injector so as to eject fuel into the cylinder at a control timing.

6. The two-cycle engine according to claim 1, further comprising means for constantly rotating said exhaust and scavenge rotary valves, each of which has a predetermined angular range of opening the associated port, and phase change means connected to the exhaust and scavenge rotary valves, respectively, to change the timings of opening and closing said valves.

* * * * *